Sept. 10, 1957          N. EMMONS III          2,805,573
GAGING FLOAT FOR INDICATING RATE OF FLOW
Filed April 1, 1953
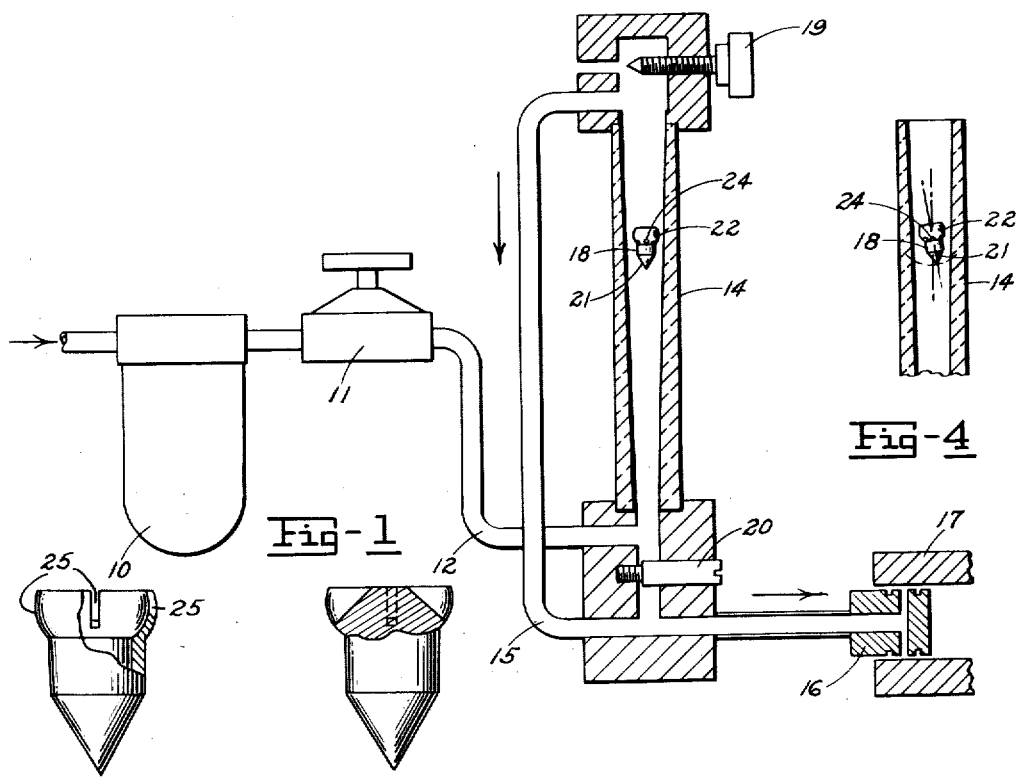
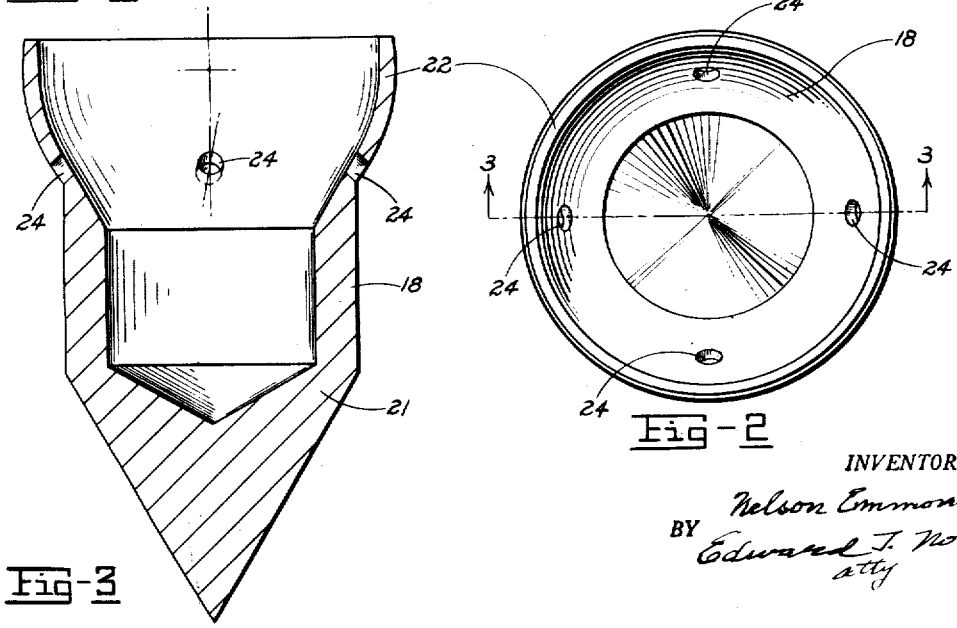
INVENTOR.
Nelson Emmons III
BY Edward J. Noe
atty

United States Patent Office 2,805,573
Patented Sept. 10, 1957

2,805,573

GAGING FLOAT FOR INDICATING RATE OF FLOW

Nelson Emmons III, Dayton, Ohio, assignor, by mesne assignments, to The Sheffield Corporation, a corporation of Ohio Application April 1, 1953, Serial No. 346,179

5 Claims. (Cl. 73—209)

This invention relates to an improved float for an air flow gaging device.

It is the object of this invention to provide a float of the type employed as an indicator for the rate of flow through an internally tapered, vertically disposed transparent flow tube used in gaging devices, which float is extremely stable and accurate in its indications.

A further object is to provide a float of the type referred to having a flared upper section through which passages are formed for the purpose of reducing fluctuations in the float movement.

A further object is to provide a float of the type referred to which is substantially cup-shaped and which has stabilizing passages passing through the wall thereof.

A further object is to provide a float of the type referred to having a flared upper portion which has an outer surface formed as a portion of a sphere which has its center below the upper end of the float whereby the vertically projected area of the float remains the same upon float rocking, resulting in more stable float operation.

Other objects and advantages of the invention will be apparent from the following description, the appended claims, and the accompanying drawing, in which, Figure 1 illustrates a float embodying the present invention operating in a flow meter associated with a gaging head, Figure 2 is a plan view of a float, Figure 3 is a sectional view along lines 3—3 of Figure 2, Figure 4 illustrates a float embodying the present invention in a sectioned flow tube showing the float in a rocking or "bobbled" position, and Figures 5 and 6 illustrate modified float forms.

Floats of the character herein involved are utilized as indicators of flow rate and are operable in an internally tapered transparent tube positioned vertically with the large end of the taper upward. The float positions itself in the taper according to the velocity of air passing through the tube.

Figure 1 shows schematically a rate of flow meter embodying such a tube associated with a gaging head. The internal taper of the tube in Figures 1 and 4 is exaggerated for purpose of illustration. Air is supplied for gaging purposes through a filter 10, a pressure regulator 11 and through a conduit 12 to the transparent flow tube 14. From the flow tube 14 it passes through a conduit 15 to a gaging head 16. In the illustrated application the gaging head 16 is shown as a spindle for gaging the diameter of a hole in a work piece 17. The proximity of the outlet orifices of the gaging head 16 to the work piece hole surface 17 controls the velocity of flow exhausting therefrom. The velocity of flow through the transparent tube 14, as controlled by the proximity of the work to the gage head 16, is indicated by a float 18 which positions itself in the tube in accordance with the rate of flow, which rate is indicative of the work piece hole diameter.

The rate of flow meter has an adjustment at 19 which allows any desired amount of air to reach the atmosphere without passing through the gaging head. This permits the float to be positioned in the tube at will. An additional adjustment is shown at 20 in Figure 1 and this controls an adjustable bypass valve. By this adjustment 20 the amplification of the rate of flow meter can be controlled as desired.

Figures 2 and 3 show in more detail the float of this invention in one embodiment. As there illustrated the float is shown as substantially cup-shaped and is hollow. It has a lower projecting portion 21 and an upper enlarged flaring portion 22. In this configuration the projecting lower portion 21 acts as a pendulum to dampen rocking of the float 18 when it is suspended in the air stream.

In this invention passages have been provided as shown at 24 through the walls of the upper flared portion 22 of the float element 18. It has been found that these passages will reduce vertical float fluctuations as much as one-half to one-third as compared with floats with similar configurations but without the passages 24. The passages 24 have some stabilizing effect when located anywhere along the length of the float 18. However, as here illustrated, they pass through the upper flared portion 22 and this has been found to be a most effective application. It is believed that the stabilizing effect is achieved by allowing the partial vacuum and turbulence which occurs at the upper end of the float to be relieved by flow directly from the high pressure or lower side of the float to this lower pressure space. Several passages spaced relatively equidistant around the float axis give a balanced flow so that the float does not tilt in the tube because of unbalanced flow through its walls.

As illustrated in Figure 3 the passages 24 are shown as slightly skewed from planes passing radially through the axis of the float element. This causes the float to rotate and has been found on some applications to aid the stability thereof. Slight imperfections in the passages and differences in their alignment and configuration resulting from manufacturing operations will give a slow spin to the float which also has a stabilizing effect. The passages 24 converge upwardly toward the axis of the float element 18.

It will be noted that the upper flared portion 22 has an outer surface which is formed as a portion of a sphere which has its center below the upper end of the float. The purpose of this continuation will appear upon examination of Figure 4. Therein the float is shown as it would be if its axis were swung out of line with the axis of the transparent tube 14 in which it is operable. At that time because of the continued spherical surface of the upper flared portion 22 the vertically projected area of the float will remain the same. This aids in stability because the effective surface of a float upon which the upwardly flowing air acts is constant. It will be readily seen that if the outer surface of the flared portion terminated at a diameter, upon rocking of the float in the tube 14 the projected area would be lessened.

Thus it is seen that a float element has been provided which is inherently stable in its operation. The passages have been found in practical operation to greatly reduce float fluctuation. These passages could be formed as slots 25 in the upper edge of the flared portion of the hollow cup-shaped float (see Figure 5). The term passages as herein employed is intended to cover such a modification. With a hollow cup-shaped float the passages could be formed in the walls of the float anywhere along its length and still give an effective stability result. With a solid cup-shaped float as shown in Figure 6, the passages would be formed through the upper flared portion and would have a stabilizing effect on such a type of float. It is believed that this stability result is achieved because of an equalizing of pressures across the float and a corresponding decrease in turbulence. The continued spherical surface of the upper flared portion of the float also serves to increase the stability in that it keeps the effective area upon which the upward flowing air impacts constant upon the swinging of the float out of alignment with the tube in which it is situated.

While the form of apparatus herein described constitutes a preferred embodiment of the invention it is to be understood that the invention is not limited to this precise form of apparatus, as changes may be made therein without departing from the scope of the invention which is defined in the appended claims.

What is claimed is:

1. A float for operation in a tapered passage of a vertically disposed transparent flow tube for use as an indicator of the rate of fluid flow upward through the passage, the float being substantially cup-shaped, the float including a downwardly projecting lower portion having an imperforate lower tip, and a wider outwardly flared upper portion, the flared upper portion having an outer surface which is a portion of a sphere the center of which is below the upper end of the float, and passages extending through the flared upper portion of the float.

2. A float for operation in a tapered passage of a vertically disposed transparent flow tube for use as an indicator of the rate of fluid flow upward through the passage, the float being substantially cup-shaped, the float including an imperforate center tip extending downwardly, and a wider outwardly flared upper portion, and holes extending through said upper portion, said holes being equally spaced about the axis of the float and similarly disposed relative to the float axis, the axes of the holes generally converging upward but being skewed equally out of radial planes passing through the float axis.

3. A float for operation in a tapered passage of a vertically disposed transparent flow tube for use as an indicator of the rate of fluid flow upward through the passage, the float being substantially cup-shaped, the float having a hollow interior and including a downwardly projecting lower portion having an imperforate lower tip, and a wider outwardly flared upper portion, the upper end of the float having an outer surface which is a portion of a sphere terminating in a plane perpendicular to the float axis, and holes through the upper float portion extending from the outer float surface to the interior of the float.

4. A float for operation in a tapered passage of a vertically disposed transparent flow tube for use as an indicator of the rate of fluid flow upward through the passage, the float being substantially cup-shaped, the float having a hollow interior and including an imperforate center tip extending downwardly and a wider outwardly flared upper portion, and a plurality of spaced holes positioned below the upper end of the float extending through the lateral wall of said float from the outside float surface to the hollow interior.

5. A float for operation in a tapered passage of a vertically disposed transparent flow tube for use as an indicator of the rate of fluid flow upward through the passage, the float being substantially cup-shaped, the float including a downwardly projecting lower portion having an imperforate lower tip, and a wider outwardly flared upper portion, the flared upper portion having an outer surface which is a portion of a sphere the center of which is below the upper end of the float, the upper end of the outer surface of the upper portion terminating in a plane perpendicular to the axis of the float and intersecting the spherically curved surface.

References Cited in the file of this patent

UNITED STATES PATENTS

| | | |
|---|---|---|
| 671,858 | Devantery | Apr. 9, 1901 |
| 979,516 | Kuppers | Dec. 27, 1910 |
| 1,899,764 | Machlet | Feb. 28, 1933 |
| 2,311,181 | Bowen | Feb. 16, 1943 |
| 2,457,297 | Aller | Dec. 28, 1948 |

FOREIGN PATENTS

| | | |
|---|---|---|
| 504,468 | Great Britain | Apr. 26, 1939 |

UNITED STATES PATENT OFFICE

CERTIFICATE OF CORRECTION

Patent No. 2,805,573  September 10, 1957

Nelson Emmons, III

It is hereby certified that error appears in the above numbered patent requiring correction and that the said Letters Patent should read as corrected below.

In the grant, line 3, and in the heading to the printed specification, line 6, State of incorporation, for "Ohio" read -- Delaware --.

Signed and sealed this 5th day of November 1957.

(SEAL)
Attest:

KARL H. AXLINE
Attesting Officer

ROBERT C. WATSON
Commissioner of Patents